United States Patent
Saward et al.

(12) 
(10) Patent No.: US 6,736,921 B1
(45) Date of Patent: May 18, 2004

(54) ON-LINE WEATHERSTRIP INSERTION AND STAKING APPARATUS AND METHOD OF USE

(75) Inventors: Eric A. J. Saward, London (CA); Allan J. Moon, Winnipeg (CA)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/689,006

(22) Filed: Oct. 12, 2000

(51) Int. Cl.[7] .............................. B29C 47/00; B23Q 1/00
(52) U.S. Cl. ................. 156/244.22; 264/249; 29/283.5; 29/451
(58) Field of Search ............................. 264/167, 171.1, 264/171.13, 249; 29/243.5, 283.5, 521, 235, 451, 561; 156/244.22, 72; 425/517

(56) References Cited

U.S. PATENT DOCUMENTS

| | | |
|---|---|---|
| 3,295,195 A | 1/1967 | Burgio, Jr. |
| 4,633,559 A * | 1/1987 | Loren ........................ 29/243.5 |
| 4,843,701 A | 7/1989 | St. Angelo et al. |
| 5,103,547 A | 4/1992 | Holloway et al. |
| 5,528,815 A * | 6/1996 | Webb ........................ 29/243.5 |
| 5,829,113 A * | 11/1998 | Socci et al. .................. 29/235 |
| 5,979,036 A | 11/1999 | Socci et al. |

FOREIGN PATENT DOCUMENTS

DE WO 00/18528 A1 * 4/2000

OTHER PUBLICATIONS

English language translation of WO00/18528.*

* cited by examiner

Primary Examiner—Michael W. Ball
Assistant Examiner—John L. Goff
(74) Attorney, Agent, or Firm—Brian B. Shaw, Esq.; Stephen B. Salai, Esq.; Harter, Secrest & Emery LLP

(57) ABSTRACT

An apparatus for inserting and staking a pile weatherstrip to an extrusion in an inline process is disclosed. The insertion assembly includes a removable/replaceable pile channel. The staking assembly includes a linear translating staking pin moveably mounted relative to an extrusion path such that the pin travels with the extrusion from an upstream position to a downstream position during contact with the extrusion.

21 Claims, 12 Drawing Sheets

FIG.9
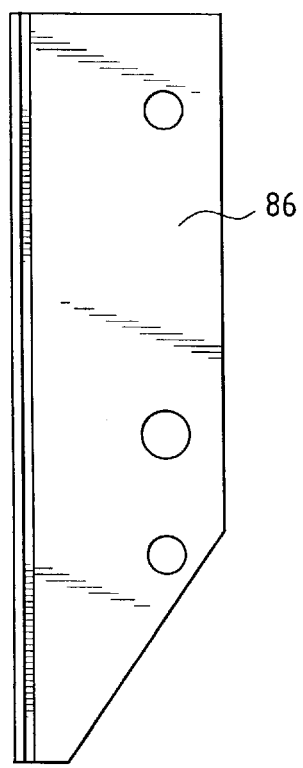
FIG.11
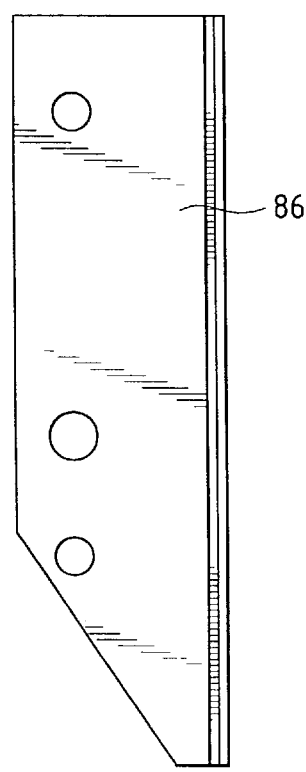
FIG.10
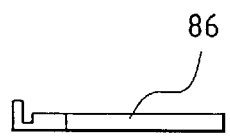
FIG.12
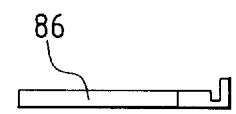
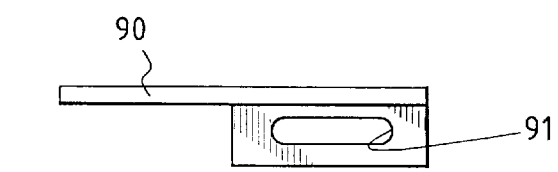
FIG.13
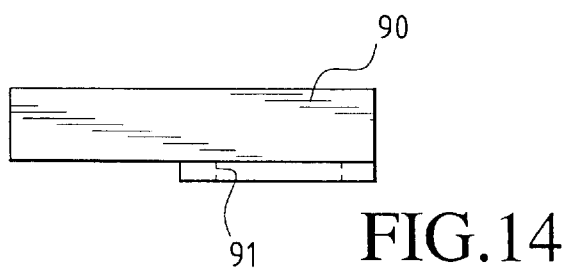
FIG.14

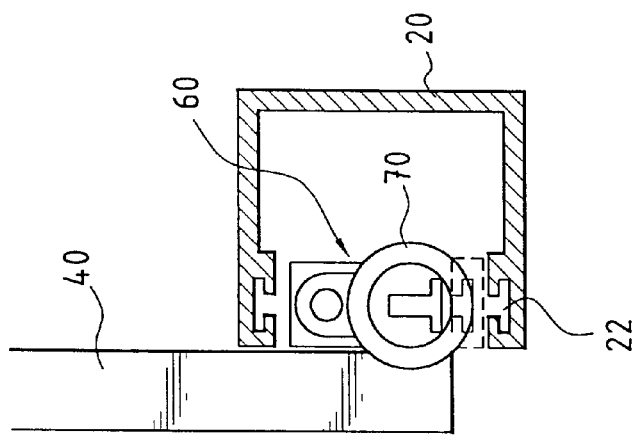
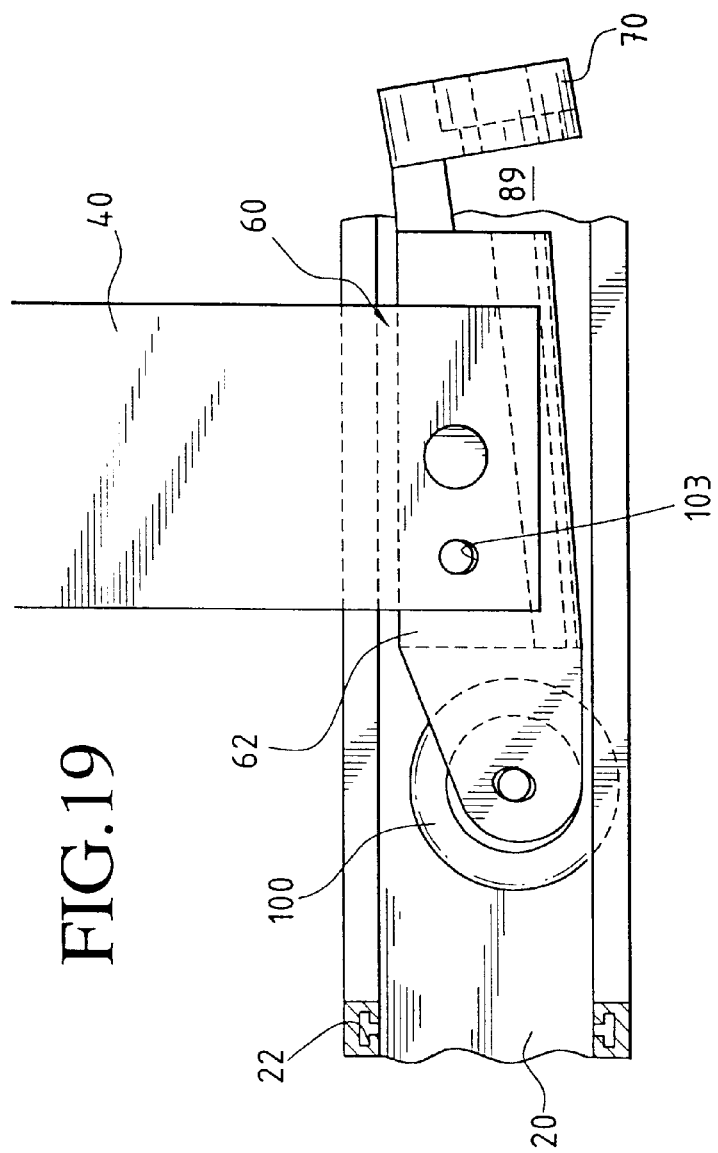

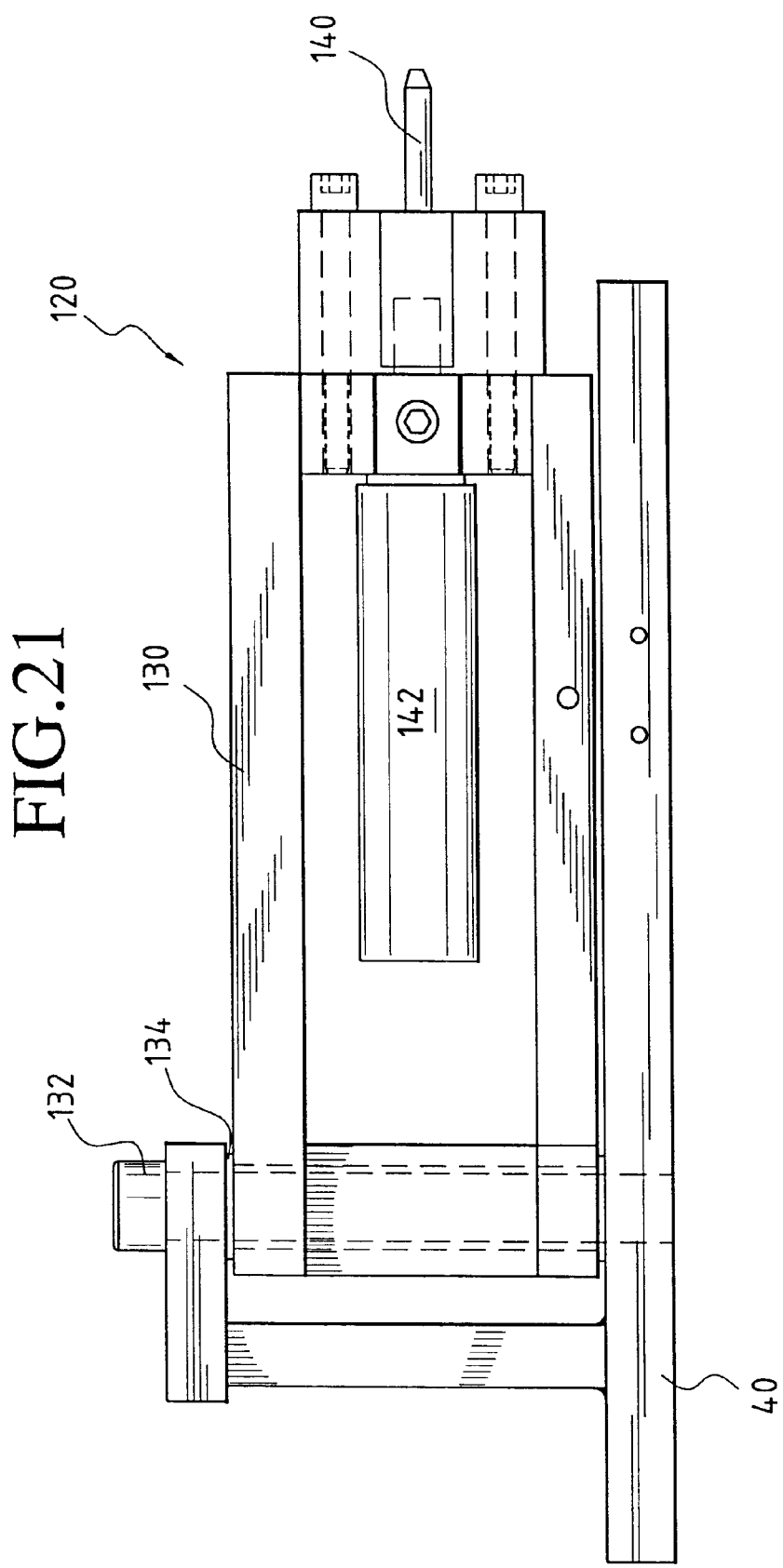

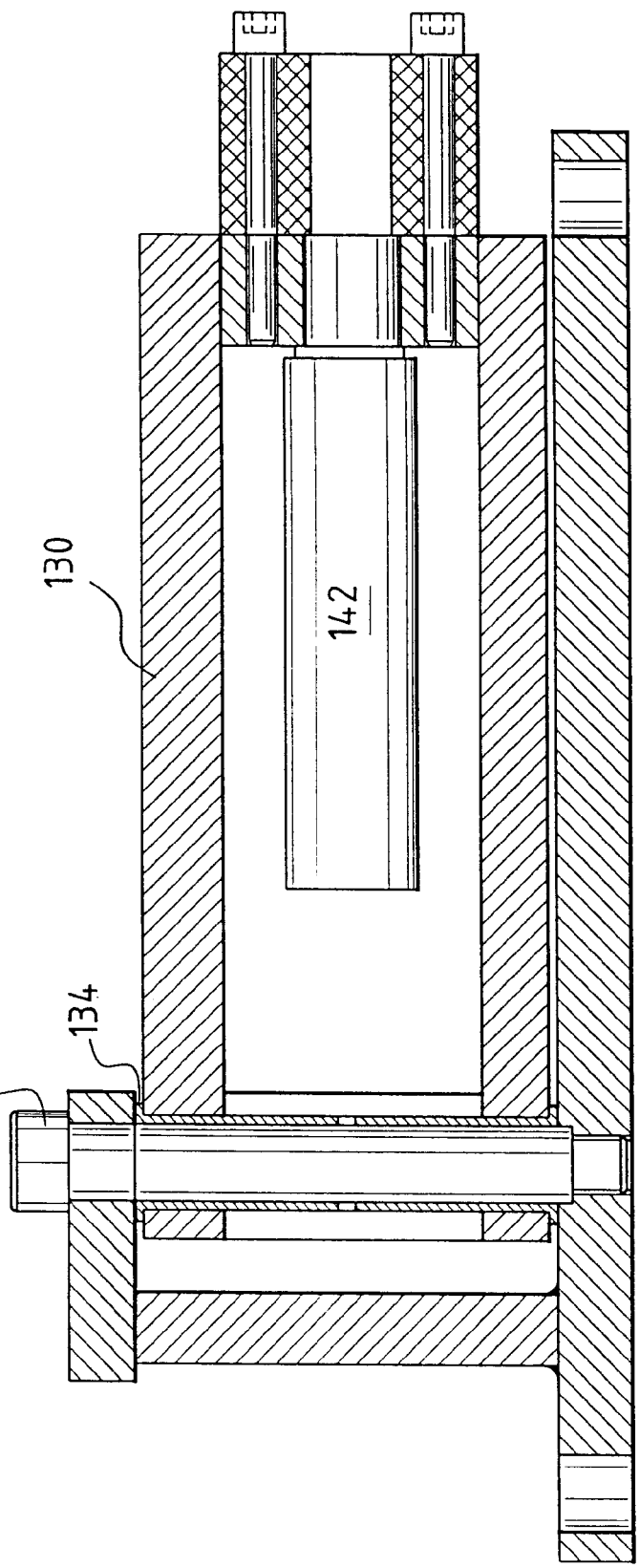

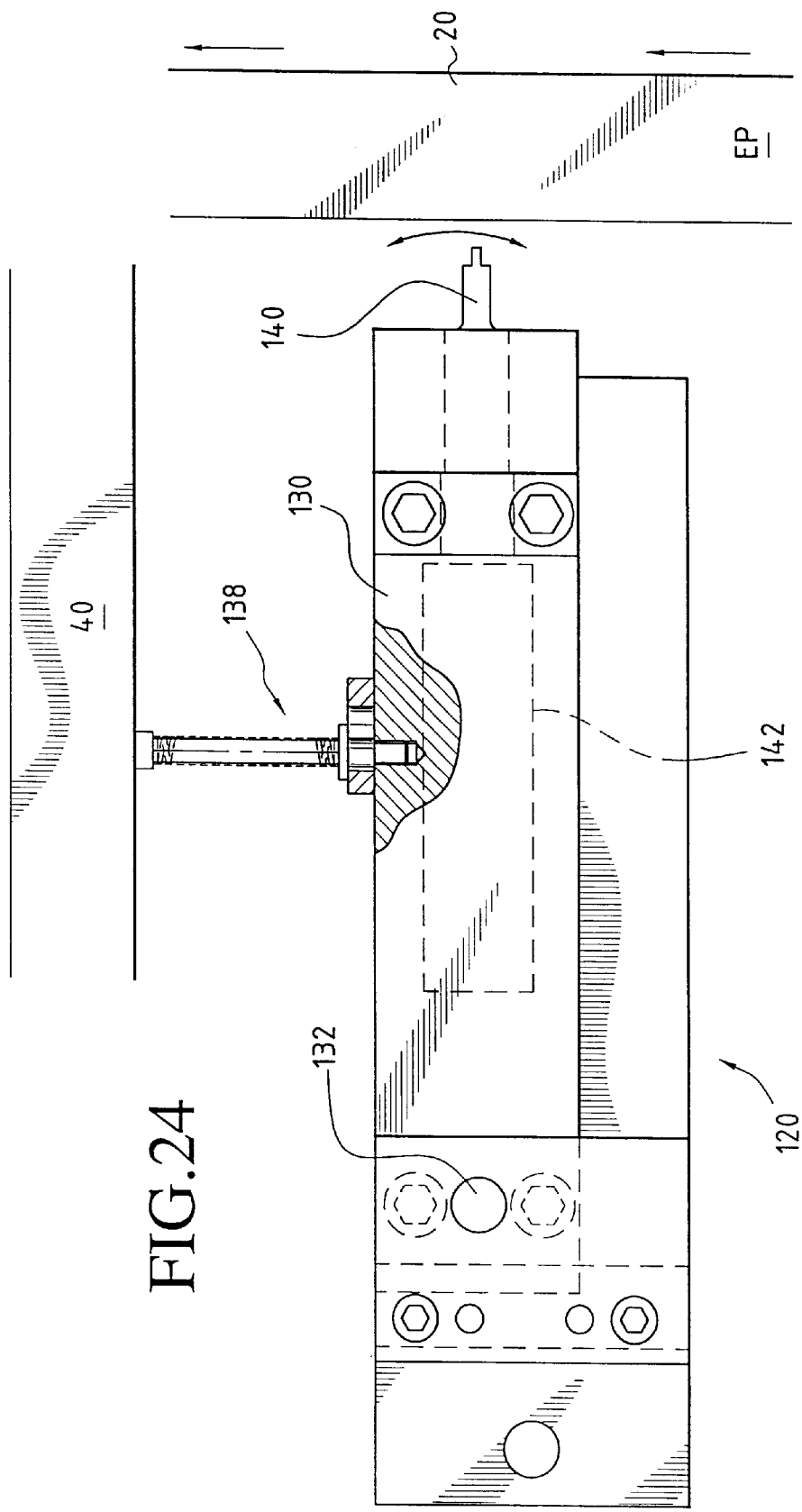

ON-LINE WEATHERSTRIP INSERTION AND STAKING APPARATUS AND METHOD OF USE

FIELD OF THE INVENTION

The present invention relates to weather seals and more particularly, to the insertion and staking of a pile weatherstrip into a slotted extrusion as an on-line process.

BACKGROUND OF THE INVENTION

Weather seals, particularly those having pile weatherstrips incorporating an impermeable barrier film or fin within the pile material, have excellent weathering properties. While such weatherstrips are used in various places for various sealing purposes, they are particularly suitable for sealing or weatherstripping the small clearance openings, such as between a window and a frame. These weatherstrips are particularly useful in door panels or window panels, or between the panels and the frames in which they are mounted, or between the door or window edge and an adjacent surface.

Today, plastics are increasingly being used as building materials such as, for example, window and door treatments and casings. Vinyl casings are often manufactured by extruding long, continuous lengths, which can be cut to length for customized jobs, or cut at regular intervals to make windows and door casings of standard dimensions. Typically, the vinyl lengths are extruded to specifications, and have slots throughout their length (typically configured as "T-slots" or "C-channels") into which weather seals, preferably including pile weatherstrips, are inserted. The pile strip is often backed with a flexible plastic strip serving as the pile base. The configuration of the pile strip can be made to adapt to a slot of any shape. Therefore, for a T-slot, the pile strip is configured into a dimensionally matching T-shape. It is this T-shaped pile weatherstrip which must be inserted into the T-slot of a window or door casing.

Pile weatherstrip insertion has been accomplished in many ways. Pile strips have been pushed or pulled into the T-slot. The strips have also been forced into the T-slots by applying a thin-wheeled roller over the strip, which is positioned over the slot. The slotted piece being extruded is then pulled forward by the hugger roller to continuously drive the strip into the slot. See U.S. Pat. Nos. 5,103,547 and 4,528,736.

To secure the newly slotted strips in the T-slot, the strips are anchored into the extrusion slot by compressing sections of the lip of the T-slot against the base of the pile strip. This process is known as staking. A staking wheel is typically provided farther downline. See U.S. Pat. No. 5,979,036.

A staking wheel is positioned adjacent the slot rim to crimp or pin the T-slot edge into the pile strip. U.S. Pat. No. 3,295,195 shows a device which first inserts and later stakes pile weatherstrip into an aluminum extrusion.

Plastic (thermoplastic or PVC) extruded window lengths are produced faster and more economically than aluminum counterparts. It would be convenient and economically desirable to insert a pile weatherstrip into plastic window lengths as part of the plastic extrusion process. Such a process would eliminate the need for a secondary pile strip insertion process into the T-slots. However, practical problems persist.

If the pile strip is inserted on the extruding line without locking in, or staking the pile strip, it will shift within the T-slot during subsequent cutting, handling and shipping. Strips that are not staked risk "drawback" or "shrink-back" during the cutting process. This refers to the condition where pile weatherstrip no longer extends to provide complete coverage over the entire length of the extruded, slotted material, but "draws back" due to being snagged, pulled or stretched at the cutting stage due to weak or no staking.

While wheel driven insertion and staking systems accommodate a staking frequency dictated by the extrusion line speed, the need exists for a system that can vary the staking frequency independent of the extrusion speed. The need exists for a system that can provide a variety of staking forces without degrading the extrusion. The need also exists for an assembly that can insert and simultaneously stake a plurality of weatherstrips to an extrusion. The need further exists where the plurality of inserted weatherstrips may be staked at different staking frequencies or with different staking forces to allow the selective removal of the weatherstrip for replacement or recycling purposes.

SUMMARY OF THE INVENTION

The present assembly provides for the inline insertion and staking of one or a plurality of pile weatherstrips into an extrusion travelling along an extrusion path. In addition, the present invention allows for a staking frequency and staking force independent of an extrusion line speed and the staking parameters of other pile weatherstrips.

In a first configuration, the present assembly includes a frame to which a first and a second insertion assembly are connected and operably located relative to the extrusion path to engage corresponding first and second weatherstrips with the extrusion, and a first and second staking assembly connected to the frame downstream of the first and second insertion assembly, respectively, to stake the respective first and second inserted weatherstrips to the extrusion.

In a further configuration, the present invention contemplates an insertion assembly for inserting a weatherstrip into an extrusion travelling along the extrusion path, the insertion assembly including a removable/replaceable pile channel sized to slideably receive the weatherstrip, an inlet guide upstream and spaced from the pile channel; and an insertion wheel located downstream of the pile channel outlet, the insertion wheel sized to engage the weatherstrip with the extrusion.

In a further configuration, the present invention includes a staking assembly including a translating arm moveably between an upstream position and a downstream position; and a staking pin connected to the translating arm for linear translation into and out of the extrusion path, independent of the extrusion line speed.

BRIEF DESCRIPTION OF THE DRAWINGS

FIG. 9 is a plan view of one of the pile channel guide members.

FIG. 10 is an end elevational view of the pile channel guide member of FIG. 9.

FIG. 11 is a plan view of a second pile channel guide member.

FIG. 12 is an end elevational view of the pile channel guide member of FIG. 11.

FIG. 13 is a top plan view of a guide finger.

FIG. 14 is a bottom plan view of the guide finger of FIG. 9.

FIG. 19 is a side elevational view of an alternative construction of the insertion assembly for internal insertion of the pile weatherstrip.

FIG. 20 is an end elevational view of the alternative insertion assembly of FIG. 19.

FIG. 21 is a side elevational view of a staking assembly.

FIG. 23 is a cross sectional view taken along lines 23—23 of FIG. 22.

FIG. 24 is a top plan view of a staking assembly showing a bias mechanism for urging the translating arm to an upstream position.

DETAILED DESCRIPTION OF THE PREFERRED EMBODIMENT

Figure 1:
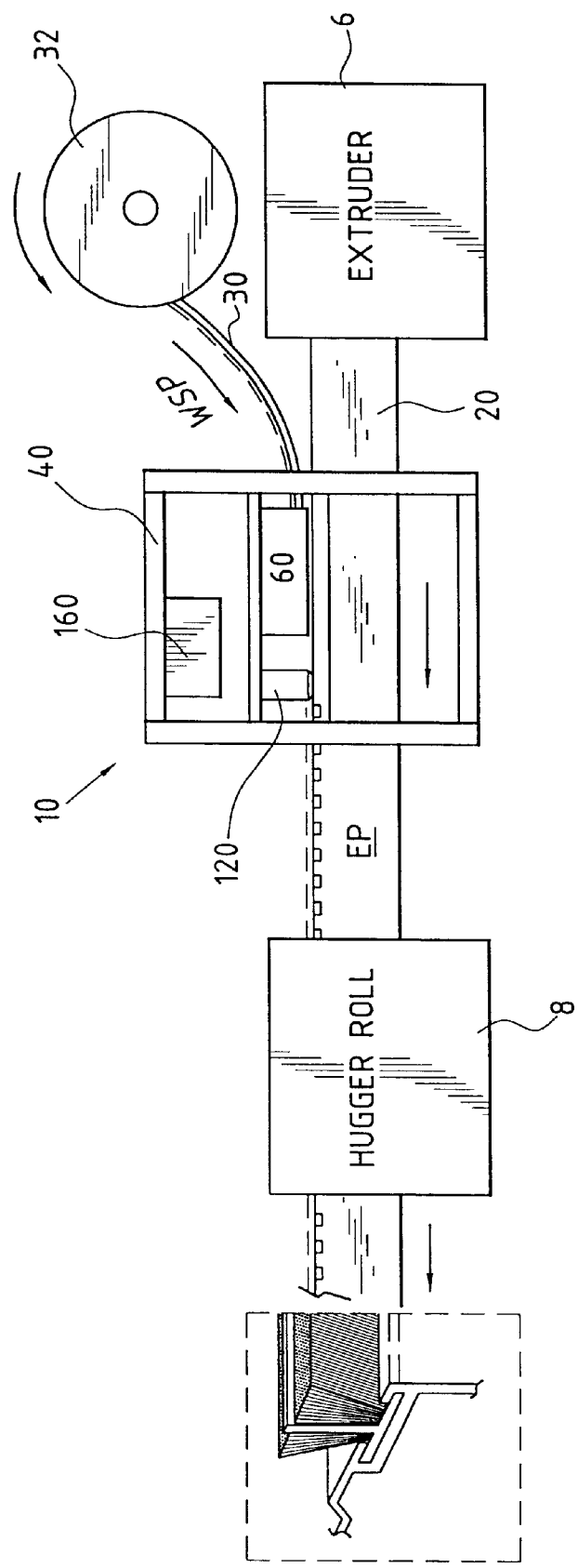
FIG. 1 is a schematic representation of the present assembly in an extrusion line.

Referring to FIG. 1, the weatherstrip insertion and staking apparatus 10 of the present invention is employed on-line in an extrusion process in cooperation with an extruder 6 and a hugger roller 8 or puller. It is understood the weatherstrip insertion and staking apparatus 10 can be located on-line upstream or downstream of the hugger roller 8. The term "on-line" encompasses the process line by which an extrusion is formed, and generally extends from the extrusion die, to a hugger roller and any downstream processing.

An extrusion path EP extends from the extruder 6 to the hugger roller 8. The extrusion path EP defines the location of an extrusion 20 at any location between the extruder 6 and the hugger roller 8. That is, the extrusion 20 travels along the extrusion path EP from the extruder 6 to the hugger roller 8, and to a downstream cutting system (not shown) for cutting the extrusion to desired lengths. A pile weatherstrip path WSP extends from a pile weatherstrip supply 32 through apparatus 10 to become concurrent with the extrusion path EP downstream of the apparatus. A pile weatherstrip 30 travels along the pile weatherstrip path WSP. The pile weatherstrip 30 typically includes a base from which pile and an impervious fin project. However, the pile weatherstrip 30 can be employed without an impervious fin.

For purposes of description, the term "upstream" shall mean the direction or location from which the extrusion comes, and the term "downstream" shall indicate the direction or location to which the extrusion travels.

Figure 3:
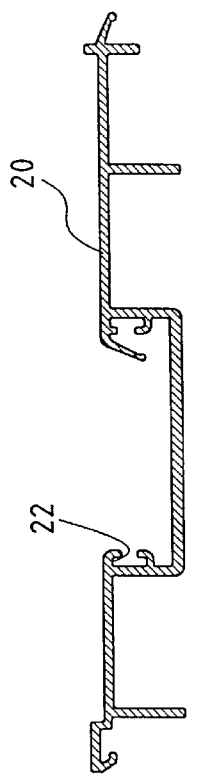
FIGS. 2–5 are exemplary cross sections of extrusions configured to receive a weatherstrip.
Figure 2:
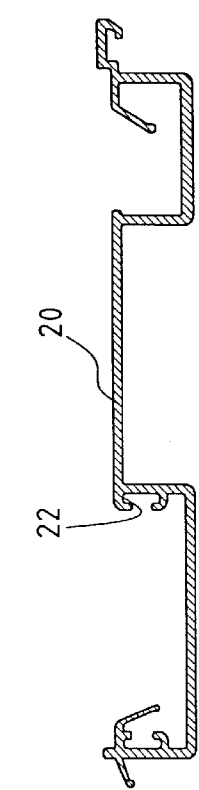
Figure 5:
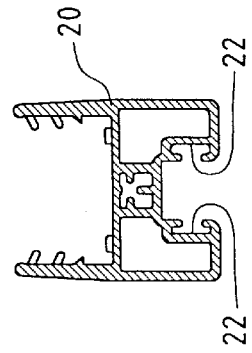
Figure 4:
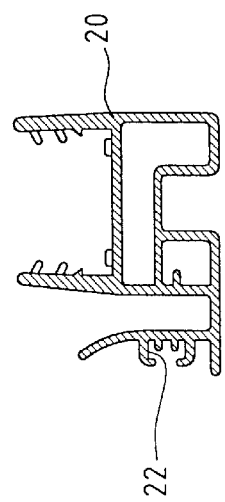

The extrusion 20 can be any of a variety of materials, such as, but not limited to thermoplastic, PVC or aluminum, and is not limiting to the present invention. That is, the present apparatus 10 can be used to insert and stake a pile weatherstrip 30 in a plastic, metal or composite extrusion 20. It is anticipated the present apparatus 10 is particularly suited for vinyl extrusions. Referring to FIGS. 2–5, the extrusion 20 includes at least one T-slot 22. However, the present apparatus 10 is configurable to insert and stake two or more pile weatherstrips 30 to a single extrusion 20. Thus, the extrusion 20 may have two or more slots 22, wherein the slots can be of separate configurations. It is understood the invention is not limited to a particular T slot or C channel, but can cooperate with a variety of slot or channel cross sections. As seen in FIGS. 2, 3 and 5, the slots 22 are internal, while the slot of FIG. 4 is external.

Referring to FIG. 1, the present invention draws the pile weatherstrip 30 from a supply roll 32 to insert and stake the weatherstrip relative to the extrusion 20 downstream of the extruder 6 and upstream of the hugger roller 8.

The weatherstrip insertion and staking apparatus 10 includes a frame 40 having an insertion assembly 60 and a staking assembly 120 connected to the frame. A controller 160 can be operably connected to the weatherstrip insertion and staking apparatus 10, and particularly the staking assembly 120 to control a staking frequency and staking force.

Frame

Preferably, the frame 40 is a free-standing structure located intermediate and independent of the extruder 6 and the downstream hugger roller 8. The frame 40 is constructed to provide a rigid structure to which the insertion assembly 60 and the staking assembly 120 are attached. The frame 40 can be formed from any of a variety of materials, such as metals, plastics and laminates. A preferred frame 40 material is UNISTRUT® channel by Unistrut Corporation of Wayne, Mich.

Figure 6:
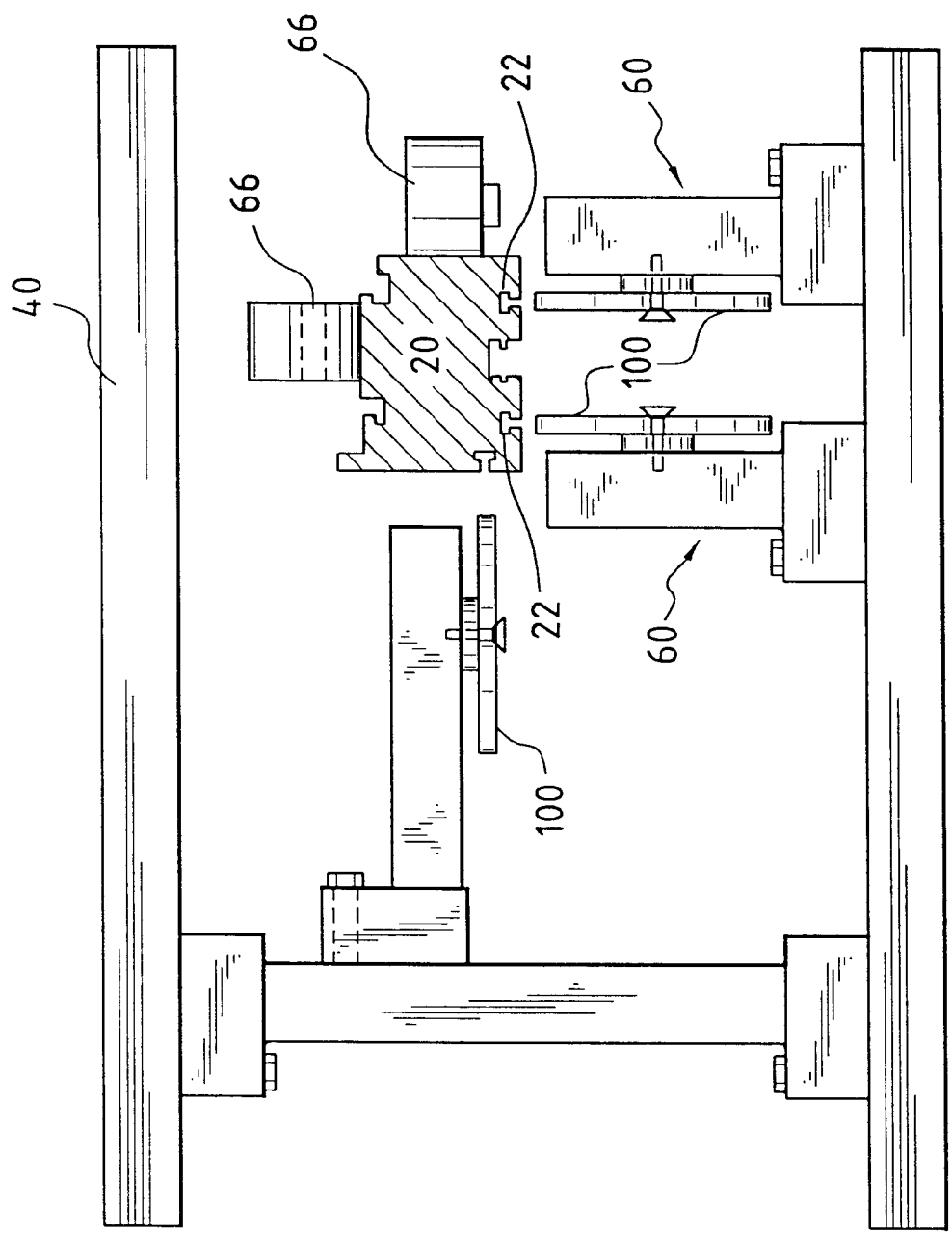
FIG. 6 is an end elevational view showing the relationship of a plurality of insertion assemblies relative to an extrusion.

The frame 40 may have any of a variety of configurations, as at least partially dictated by the configuration of the extrusion path EP in the extrusion line. In a first configuration, the frame 40 is constructed to encircle or circumscribe the extrusion path EP. That is, the extrusion path EP passes through a portion of the frame 40. However, it is understood the frame 40 does not have to enclose the extrusion path EP. That is, as seen in FIG. 6, the frame 40 can be located adjacent the extrusion path EP, such that the extrusion path does not pass through a portion of the frame.

Insertion Assembly

As shown in FIG. 1, the insertion assembly 60 is connected to the frame 40 upstream of the staking assembly 120. The insertion assembly 60 defines a portion of the pile weatherstrip path WSP. Referring to FIG. 6, the insertion assembly 60 may cooperate with an opposing support wheel 66. The support wheel 66 is selected to provide a balancing force against the insertion and staking forces applied to the extrusion 20.

Figure 8:
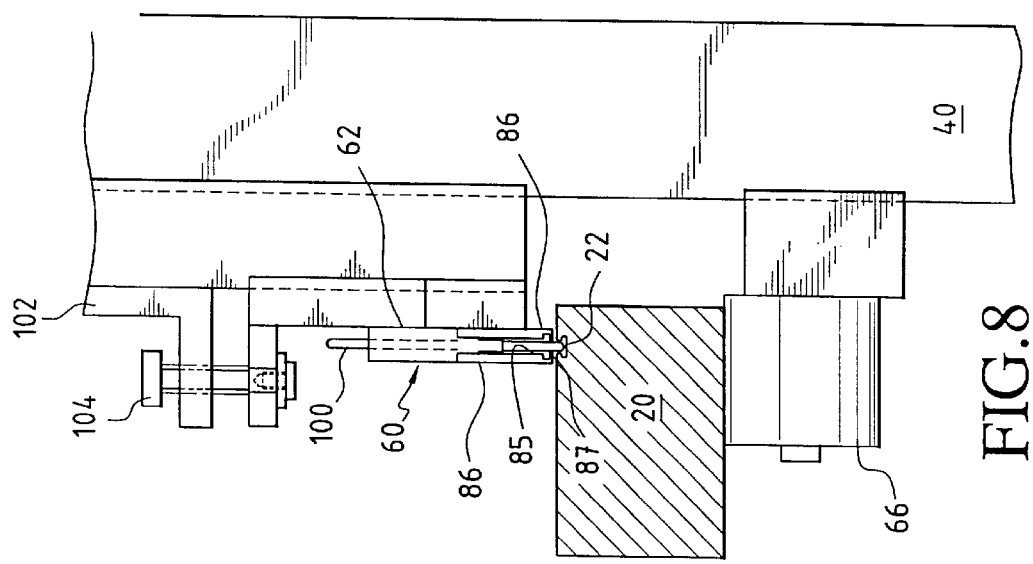
FIG. 8 is an end elevational view of the insertion assembly.
Figure 7:
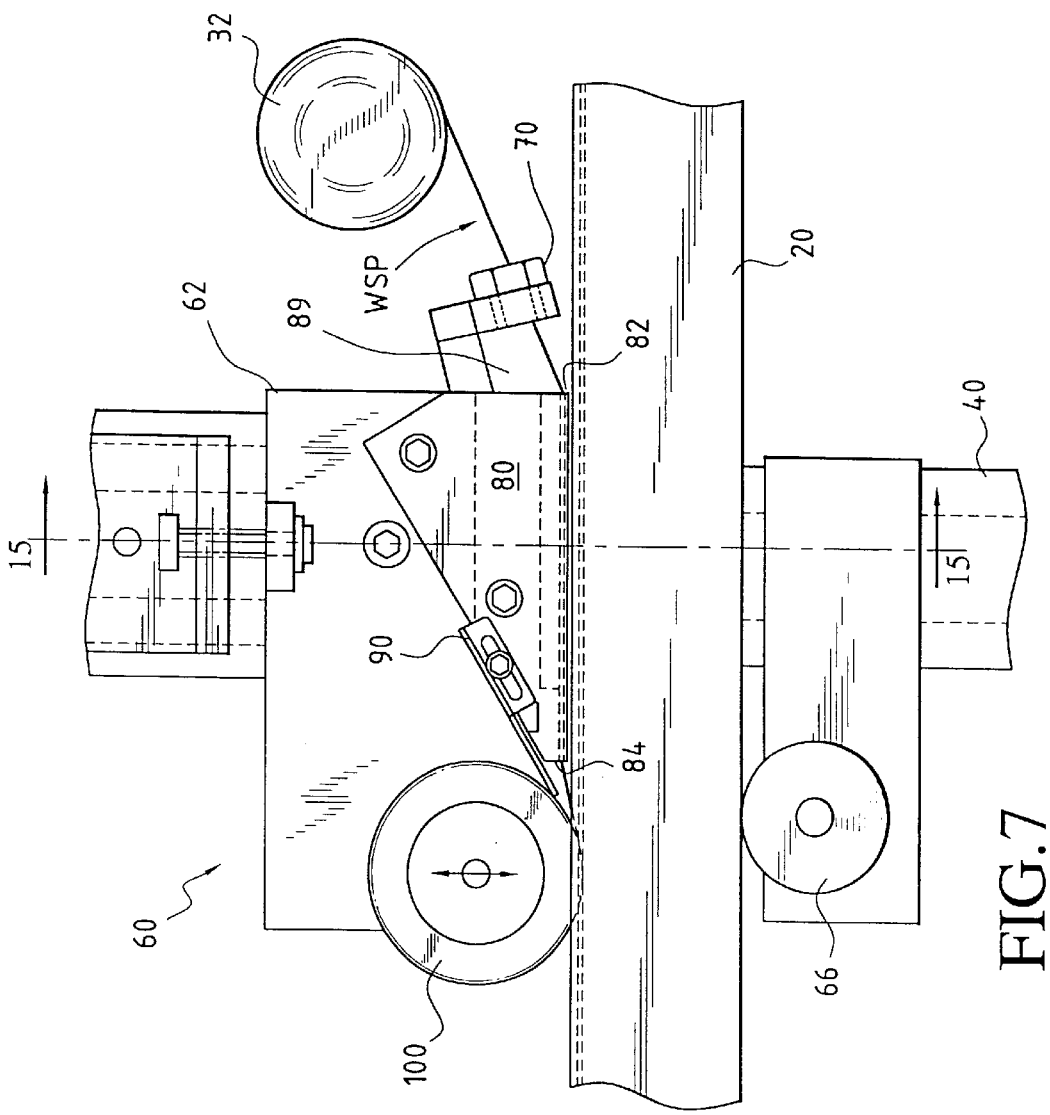
FIG. 7 is a side elevational view of the insertion assembly.

Referring to FIGS. 7 and 8, the insertion assembly 60 includes a main body 62, an inlet guide 70, a removable pile channel 80, a directing finger 90 and an inserting wheel 100.

The inlet guide 70 is connected to the main body 62 and provides the initial contact of the pile weatherstrip 30 from the supply roll 32. In a preferred construction, the inlet guide 70 has an annular construction and is formed of a ceramic material. The ceramic construction provides enhanced wear characteristics over prior plastic guides. As shown in FIG. 7, the inlet guide 70 can be generally aligned concentric with the pile weatherstrip path WSP. However, it is understood the inlet guide 70 is used to slightly redirect the pile weatherstrip path WSP, as well as accommodate varying angles of the incoming pile weatherstrip as the effective diameter of the supply roll 32 changes.

The removable pile channel 80 is connected to the main body 62 downstream of the inlet guide 70 and has an upstream inlet 82 and a downstream outlet 84. The pile channel 80 is sized to define a portion of the pile weatherstrip path WSP that is substantially parallel to the adjacent extrusion path EP.

The pile channel 80 is formed by a pair of pile channel guides 86 that are removably connected to the main body 62. The pile channel guides 86 can be releasably attached to the main body 62 by any of a variety of structures, including but not limited to threaded fasteners such as screws or bolts, clamps, corresponding grooves and flanges or even magnets.

As shown in FIGS. 8–12, the pile channel guides 86 are mirror images of each other. The pile channel guides 86 define a pile passageway 85 having a cross section complimentary to the pile weatherstrip 30. That is, the pile passageway 85 has generally the same profile as the pile weatherstrip 30, with sufficient clearance to reduce wear from the passing pile weatherstrip. As seen most clearly in FIG. 8, the pile channel guides 86 define the pile passageway 85 to include a longitudinal slot 87 extending the length of the pile channel. The slot 87 allows access to the pile weatherstrip in the insertion assembly 60 for any necessary remedial action, as well as set up threading of the pile weatherstrip 30.

The pile channel guides 86 can be formed of a variety of materials. Preferably, the channel guides 86 do not degrade the passing pile weatherstrip 30, while having sufficient wear characteristics to preclude excess wearing of the guides. The pile channel guides 86 are formed of a material selected for abrasion resistant characteristics with respect to the weatherstrip 30. A satisfactory material has been found to be H13/A440 steel.

Upon wearing of the channel guides 86 or the need to employ an alternative pile having a unique cross-sectional profile, the pile channel guides 86 may be removed from the main body 62 and alternative pile channel guides readily attached to the main body.

Although the pile channel 80 is shown constructed from a pair of guides 86, it is understood the pile channel can be formed of a single appropriately configured member, or multiple components.

Preferably, as shown in FIG. 7, the inlet 82 to the pile channel 80 is spaced downstream from the inlet guide 70 to define a gap 89 there between. The gap 89 is sized to permit the dislocation and removal of lint or other material which may accumulate or gather as the pile weatherstrip 30 enters the pile channel 80. A typical gap size is between approximately one quarter inch to approximately 3 inches. The gap 89 is sized to permit a brush, sweep or air jet dislocate any accumulated material with the gap or inlet to the pile channel 80.

Referring to FIG. 7, the deflecting finger 90 is connected to the main body 62 to be located adjacent the outlet 84 of the pile channel 80. The deflecting finger 90 is configured to deflect the pile weatherstrip 30 toward the corresponding slot 22 (shown in FIGS. 6 and 8) in the extrusion 20 and adjacent to, and downstream of the inserting wheel 100. In a preferred construction, the deflecting finger 90 is adjustably connected to the main body 62 to allow accommodation for different configurations of the apparatus 10 and corresponding extrusion 20. Thus, as shown in FIGS. 13 and 14, the deflecting finger 90 includes an adjusting slot 91.

Referring to FIG. 7, the inserting wheel 100 is rotatably connected to the main body 62 downstream of the deflecting finger 90 and is sized and located to cause the base of the pile weatherstrip 30 to be disposed within the corresponding slot 22 in the extrusion 20. The inserting wheel 100 can be formed of any of a variety of materials such as plastic, metal, alloy or composites.

Figure 15:
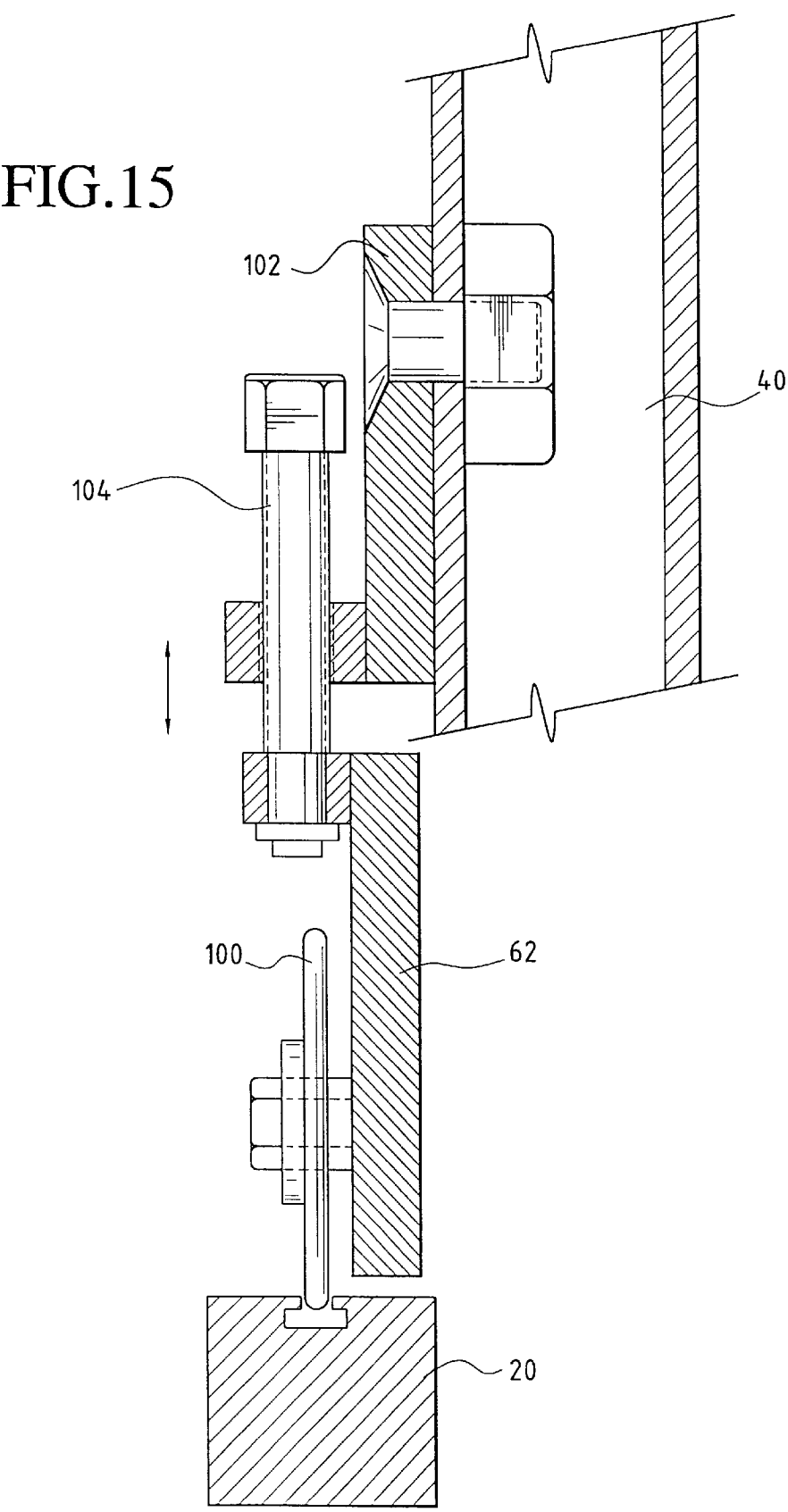
FIG. 15 is a cross-sectional view of the depth adjustment mechanism for the inserting wheel.

In a preferred configuration, the axis of rotation of the inserting wheel 100 is selectively movable with respect to the extrusion 20 so as to vary the extent of penetration of the inserting wheel into the corresponding slot 22 on the extrusion, as seen in FIGS. 7 and 8. Referring to FIG. 15, the inserting wheel 100 is rotatably connected relative to the main body 62. An adjusting bolt 104 interconnects the main body 62 to a bracket 102. The bracket 102 is connected to the frame 40. The adjusting bolt allows the main body 62 to be displaced relative to the bracket 102 and the frame 40, thereby changing the location of the axis of rotation of the inserting wheel 100 relative to the frame 40, and hence extrusion path EP and slot 22 in the extrusion 20.

Figure 17:
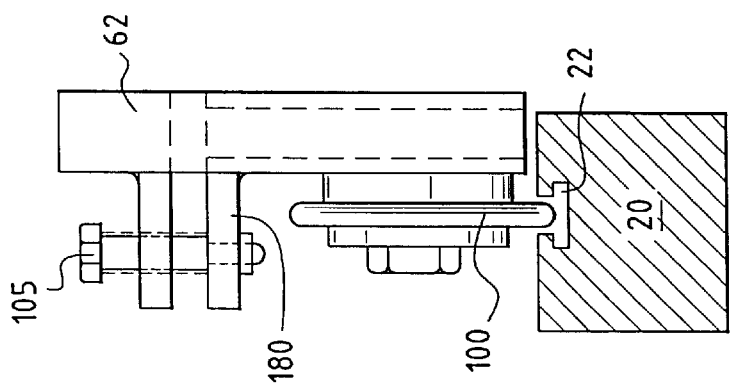
FIG. 17 is an end elevational view of the configuration of FIG. 16.
Figure 16:
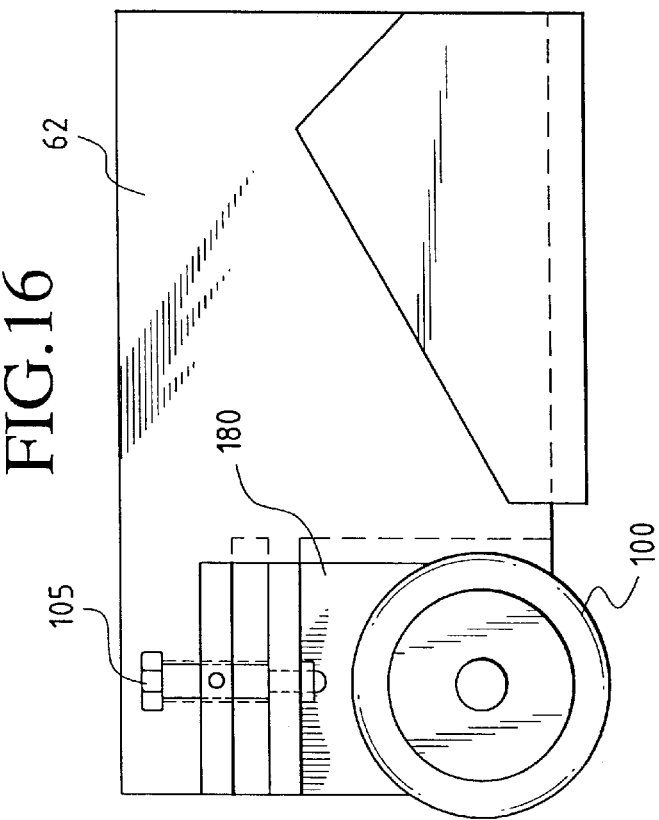
FIG. 16 is a side elevational view of an alternative configuration of the depth adjustment mechanism for operation of the insertion wheel in a limited available space environment.
Figure 18:
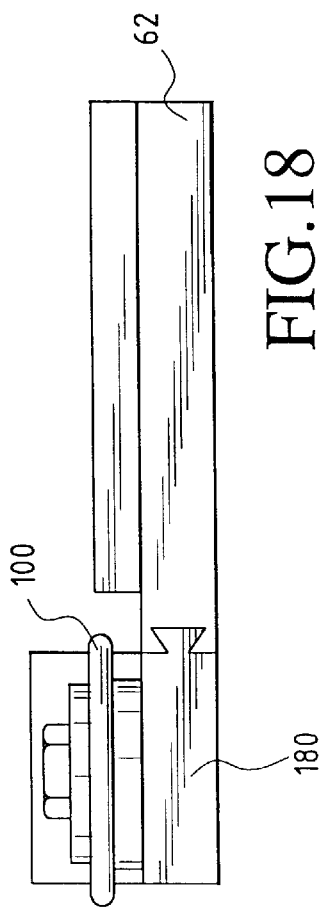
FIG. 18 is a bottom end view of the configuration of FIG. 16.

Referring to FIGS. 16–18, the depth of penetration of the inserting wheel 100 into the channel 22 can be adjusted by moving the inserting wheel relative to the main body 62. In this configuration, a slide block 180 is slideably connected to the main body 62 to be translatable transverse to the adjacent section of the extrusion path EP. The inserting wheel 100 is rotatably mounted to the slide block 180. An adjusting bolt 105 interconnects the slide block 180 and the main body 62 and allows the distance there between to be varied. Thus, the amount the inserting wheel 100 penetrates the channel 22 can be adjusted.

Referring to FIG. 19, the adjustment of the inserting wheel 100 relative to the extrusion 20 can be obtained by pivotally mounting the main body 62 to the frame 40. An adjustment slot 103 is formed in the main body 62 at a location spaced from the pivotal connection of the main body and the frame. In this configuration, the relation of the inserting wheel 100 to the main body 62 is fixed and the main body is tilted relative to the frame 40 to locate the periphery of the inserting wheel at the desired location with respect to the extrusion 20. Alternatively, the frame 40 can include the adjustment slot, wherein the main body includes a locating pin sized to be received in the locating slot.

As shown in FIG. 20, the inserting assembly 60 can be located within a portion of the extrusion 20 to insert the weatherstrip 30 at an inner surface of the extrusion. A subsequent inserting assembly can be connected to the frame 40 at a downstream location to insert a separate weatherstrip in the opposing slot 22.

Referring to FIG. 7, the pile weatherstrip path WSP thus extends from the supply roll 32 through the inlet guide 70 and across the gap 89 to the pile channel inlet 82. The pile weatherstrip path WSP then extends along the pile channel 80 parallel to an adjacent portion of the extrusion path EP to be then directed toward the extrusion path by the deflecting finger 90. The inserting wheel 100 causes the pile weatherstrip path WSP to become coincident with the extrusion path EP.

Staking Assembly

Figure 22:
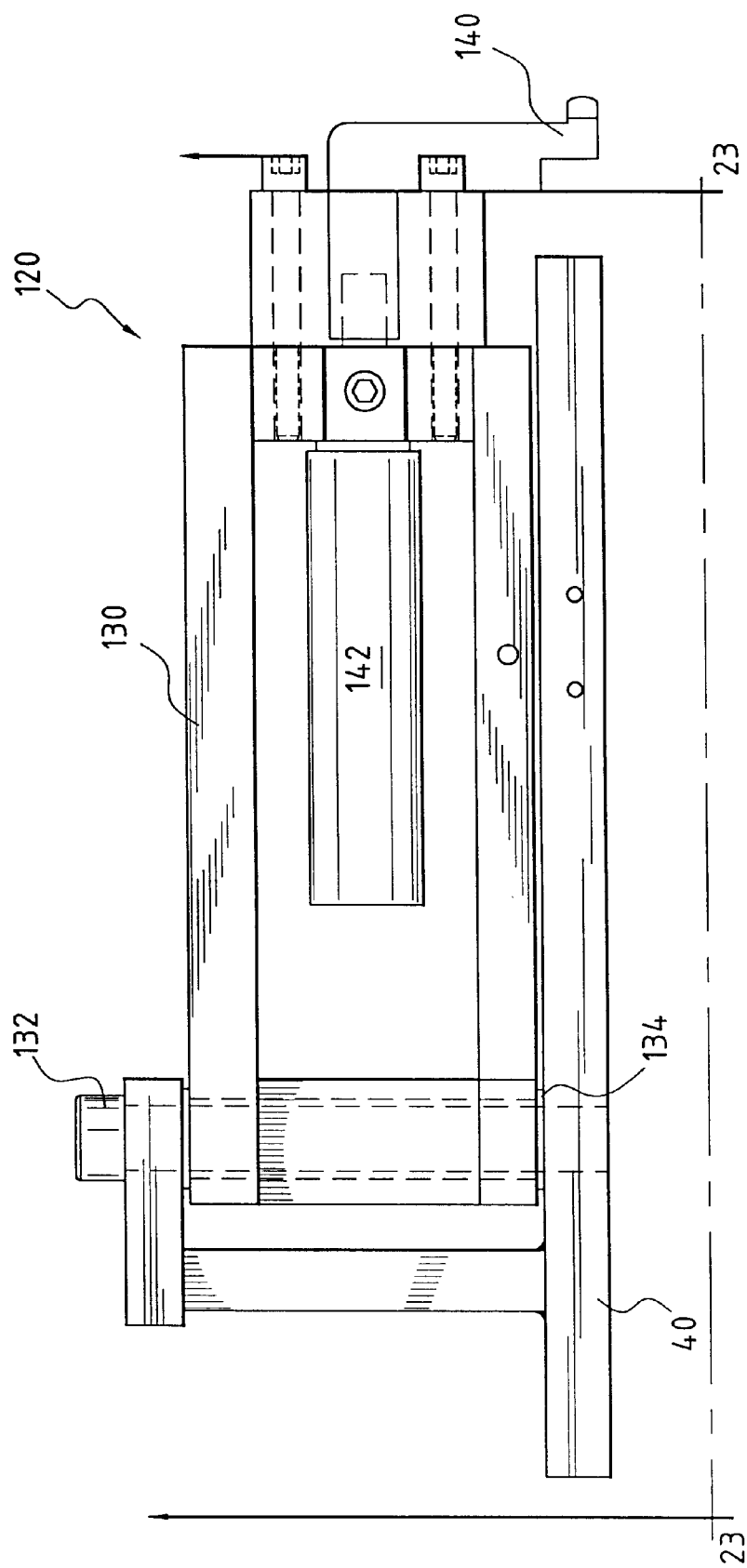
FIG. 22 is a side elevational view of the staking assembly with an alternative staking pin.

Referring to FIG. 1, the staking assembly 120 is connected to the frame 40 downstream of the insertion assembly 60. As shown in FIGS. 21, 22 and 24, the staking assembly 120 includes a translating arm 130, and a linear translating staking pin 140.

In a first configuration, the translating arm 130 is pivotally connected relative to the frame 40 such that the arm may swing (travel) between an upstream position and a downstream position, as shown in FIG. 24. The translating arm 130 is connected to the frame 40 such that the upstream position and the downstream position are coplanar with an adjacent section of the extrusion path EP. That is, as the translating arm 130 traces an arc wherein the plane of the arc includes the adjacent extrusion path EP.

A typical connection of the translating arm 130 to the frame 40, as seen in FIGS. 21, 22 and 23 includes a pivot bolt 132 and corresponding bushing 134.

As shown in FIG. 24, a bias mechanism 138 is connected between the frame 40 and the pivoting, translating arm 130 to urge the arm to the upstream position. The bias mechanism 138 is selected to permit travel of the translating arm from the upstream position to the downstream position upon corresponding contact with the extrusion 20 during staking. The bias mechanism 138 can be any of a variety of configurations including coil springs, leaf springs or stiff wires.

The linear translating staking pin 140 is connected to the translating arm 130 for movement between a retracted position and an extended position. Preferably, the retracted position is out of the extrusion path EP and the extended position intersects the extrusion path. As shown in FIGS. 18, 21, 22 and 24, the staking pin 140 can have any of a variety of cross sections, such as but not limited to circular, offset, rectangular, arcuate, square, curvilinear or multi faceted. The specific cross section of the staking pin 140 is at least partially dictated by the intended performance of the apparatus 10, the material of the extrusion 20 and the pile weatherstrip 30. Referring to FIG. 22, the staking pin 140 can be offset from the extrusion 20.

The linear translating staking pin 140 is moved between the retracted position and the extended position by a selectively actuatable driver 142. It is understood that a variety of drivers 142 can be employed to translate the staking pin from the retracted to the extended position, including solenoids, pistons, cam and spring mechanisms. Referring to FIGS. 21–24, a preferred driver 142 is a pneumatic or hydraulic cylinder, with the pneumatic cylinder being most preferred. The driver 142 can be operably connected to the controller 160 for controlling a variety of operating parameters of the driver, such as the frequency of activations of the driver, the duration of the driving disposing the staking pin in the extended position and the staking force.

The amount of travel between the extended and retracted position of the staking pin 140 can be readily adjusted by the length of the staking pin, the connection of the staking pin to the driver 142 or the throw of the driver.

Adjustment of the staking pin 140 relative to the extrusion path EP can be accommodated by an adjusting mechanism for directing the translating path of the staking pin 140.

The staking pin 140 can be constructed to be collinear with the motion of the driver 142. Alternatively, the staking pin can be offset from the motion of the driver 142, as shown in FIG. 22. The staking pin 140 can be generally perpendicular to the adjacent section of the extrusion path EP, as seen in FIG. 24. However, it is understood, the staking pin 140 can be inclined relative to the adjacent section of the extrusion path EP. That is, as the staking pin 140 moves from the retracted to the extended position, the staking pin contacts the extrusion 20 non perpendicular to the local extrusion path EP, about any of a plurality of axes.

Although the translating arm 130 is shown in terms of a pivoting relationship to the frame 40 and hence extrusion path EP, it is understood in an alternative configuration, the translating arm 130 and staking pin 140 may travel along a slide or track extending substantially parallel to the adjacent extrusion path EP. A shoe or slider can be slideably connected to the track to allow the motion of the translating arm 130 and staking pin 140 along the extrusion path EP. That is, the translating arm 130 and staking pin 140 maintain their orientation relative to the extrusion path EP between the upstream position and the downstream position. This is in contrast to the pivoting configuration of the translating arm 130, where the orientation of the translating arm 130 (and staking pin 140) relative to the extrusion 20, changes between the upstream position and the downstream position.

In either configuration, the staking pin 140 again moves between an upstream and a downstream position (as well as the retracted and extended position), wherein the bias mechanism 138 urges the staking pin back toward the upstream position.

Operation

In operation, the extrusion 20 passes from the extruder 6 and travels along the extrusion path EP toward the weatherstrip insertion and staking apparatus 10, and specifically, the frame 40 and the insertion assembly 60. The pile weatherstrip 30 extends from the supply roll 32 through the inlet guide 70 to the pile channel 80 to be deflected by the deflecting finger 90 toward the inserting wheel 100. The inserting wheel 100 is located to dispose and engage the base of the pile weatherstrip 30 within the corresponding slot 22 in the extrusion 20.

The controller 160 is set to actuate the driver 142 and move the staking pin 140 from the retracted position to the extended position, as the bias mechanism urges the pivot arm 130 to the upstream position. The controller 160 actuates the driver 142 and sets the staking frequency independent of the extrusion line speed. However, it is understood the controller 160 can monitor the line speed of the extrusion and accordingly set a staking frequency. Thus, while the staking frequency can be independent of the line speed, a signal corresponding to the line speed can be provided to the controller 160 and the controller can set a staking frequency that is determined by the line speed. The controller 160 can also regulate the staking depth, that is, the depth of penetration of the staking pin 140 into the extrusion 20.

As the staking pin 142 is moved to the extended position in the upstream position of the translating arm 130, the staking pin contacts the extrusion 20 and initiates the deformation of the extrusion to contact to the inserted pile weatherstrip 30. The pile weatherstrip 30 is thus staked to the extrusion 20. During the period of contact between the staking pin 142 and the extrusion 20, the extrusion moves downstream along the extrusion path EP. This downstream movement of the extrusion 20 causes the translating arm 130 to swing from the upstream position to the downstream position.

The amount of travel between the upstream and downstream position of the translating arm 130 and the duration of contact of the staking pin 140 and the extrusion 20 is set such that the staking pin is drawn toward the retracted position and away from contact with the extrusion prior to the arm reaching the downstream position.

As the staking pin 140 no longer contacts the extrusion 20, the bias mechanism 138 urges the translating arm 130 to the upstream position and the staking pin returns to the retracted position, for a subsequent staking operation.

In the most preferred embodiment, the insertion assembly 60 does not require any motorization. The insertion assembly 60 employs contact between the inserting wheel 100 and the extrusion 20 to rotate the inserting wheel and thus insert the weatherstrip 30 in the extrusion 20.

As the staking process is independent of the line speed and subject to the independent controller 160, the staking frequency and force may be adjusted to provide permanent staking, which substantially precludes non-destructive separation of the pile from the extrusion; or a temporary staking, wherein the pile weatherstrip is sufficiently staked for cutting to length and operable insertion into an operating environment, wherein a worn seal may be removed and a replacement seal inserted in a subsequent onsite operation.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims which scope is to be accorded the broadest interpretation so as to encompass all such modifications and equivalent structures.

What is claimed is:

1. A staking assembly for staking a pile weatherstrip to a slot in an extrusion passing along an extrusion path, the assembly comprising:
   (a) a first arm moveable between an upstream position and a downstream position relative to the extrusion path; and
   (b) a first staking pin moveably connected to the first arm between a retracted position and an extended position.

2. The assembly of claim 1, wherein the first arm travels along an arcuate path relative to the extrusion path.

3. The assembly of claim 1, further comprising a second arm moveable between a corresponding upstream position and a corresponding downstream position relative to the extrusion path and a second staking pin moveably connected to the second arm between a corresponding retracted position and a corresponding extended position.

4. The assembly of claim 3, wherein the second arm travels along an arcuate path relative to the extrusion path.

5. The assembly of claim 1, further comprising an insertion assembly upstream of the first arm.

6. The assembly of claim 1, wherein the staking pin linearly translates relative to the first arm between the retracted position and the extended position.

7. The assembly of claim 1, further comprising a selectively actuatable piston connected to the first arm and first staking pin to move the first staking pin between the retracted position and the extended position.

8. A method for staking a pile weatherstrip to a slot in an extrusion passing along an extrusion path, the method comprising:
   (a) moving a first arm between an upstream position and a downstream position relative to the extrusion path; and
   (b) moving a first Staking pin moveably connected to the first arm between a retracted position and an extended position.

9. The method of claim 8, further comprising moving the first aim along an arcuate path relative to the extrusion path.

10. The method of claim 8, further comprising moving a second arm moveable between a corresponding upstream position and a corresponding downstream position relative to the extrusion path and a moving a second staking pin moveably connected to the second arm between a corresponding retracted position and a corresponding extended position.

11. The method of claim 8, further comprising adjusting an amount of travel of the staking pin between the retracted position and the extended position.

12. The method of claim 8, further comprising biasing the first arm toward the upstream position.

13. The method of claim 8, further comprising moving the first arm along a linear path relative to the extrusion path.

14. The method of claim 8, further comprising controlling a staking force of the first staking pin.

15. The method of claim 8, further comprising selecting one of a plurality of staking frequencies for a given speed of the extrusion along the extrusion path.

16. The assembly of claim 1, wherein the first arm travels linearly relative to the extrusion path.

17. The assembly of claim 1, wherein an amount of travel of the staking pin between the retracted position and the extended position is adjustable.

18. The assembly of claim 1, further comprising a controller connected to the first staking pin for controlling movement of the staking pin from one of the retracted position and the extended position.

19. The assembly of claim 1, further comprising a bias mechanism connected to the first arm to urge the first arm to the upstream position.

20. The assembly of claim 1, wherein a staking force of the first staking pin is adjustable.

21. The assembly of claim 1, wherein a staking frequency of the first staking pin is selected from a plurality of available staking frequencies for a given speed of the extrusion along the extrusion path.

* * * * *

UNITED STATES PATENT AND TRADEMARK OFFICE
CERTIFICATE OF CORRECTION

PATENT NO. : 6,736,921 B1
DATED : May 18, 2004
INVENTOR(S) : Saward, Eric A. J. and Moon, Allan J.

It is certified that error appears in the above-identified patent and that said Letters Patent is hereby corrected as shown below:

Column 8,
Line 28, insert -- 138 -- after "the bias mechanism".

Column 9,
Line 35, insert -- the -- after "piston connected to the first arm and".

Column 10,
Line 1, "Staking" should read -- staking --.
Line 5, "aim" should read -- arm --.
Line 9, "and a moving a second staking pin" should read -- and moving a second staking pin --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,736,921 B1
DATED : May 18, 2004
INVENTOR(S) : Saward, Eric A. J. and Moon, Allan J.

It is certified that error appears in the above-identified patent and that said Letters Patent is hereby corrected as shown below:

Column 8,
Line 20, insert -- 138 -- after "the bias mechanism".

Column 10,
Line 1, "Staking" should read -- staking --.
Line 5, "aim" should read -- arm --.
Line 9, "and a moving a second staking pin" should read -- and moving a second staking pin --.

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,736,921 B1  Page 1 of 1
DATED : May 18, 2004
INVENTOR(S) : Saward, Eric A. J. and Moon, Allan J.

It is certified that error appears in the above-identified patent and that said Letters Patent is hereby corrected as shown below:

Column 8,
Line 28, insert -- 138 -- after "the bias mechanism".

Column 9,
Line 35, insert -- the -- after "piston connected to the first arm and".

Column 10,
Line 1, "Staking" should read -- staking --.
Line 5, "aim" should read -- arm --.
Line 9, "and a moving a second staking pin" should read -- and moving a second staking pin --.

This certificate supersedes Certificate of Correction issued August 17, 2004 and September 21, 2004.

Signed and Sealed this

Thirtieth Day of May, 2006

JON W. DUDAS
*Director of the United States Patent and Trademark Office*